(No Model.)
A. J. CALLAWAY.
CORN PLANTER AND DRILL COMBINED.
No. 400,897. Patented Apr. 9, 1889.
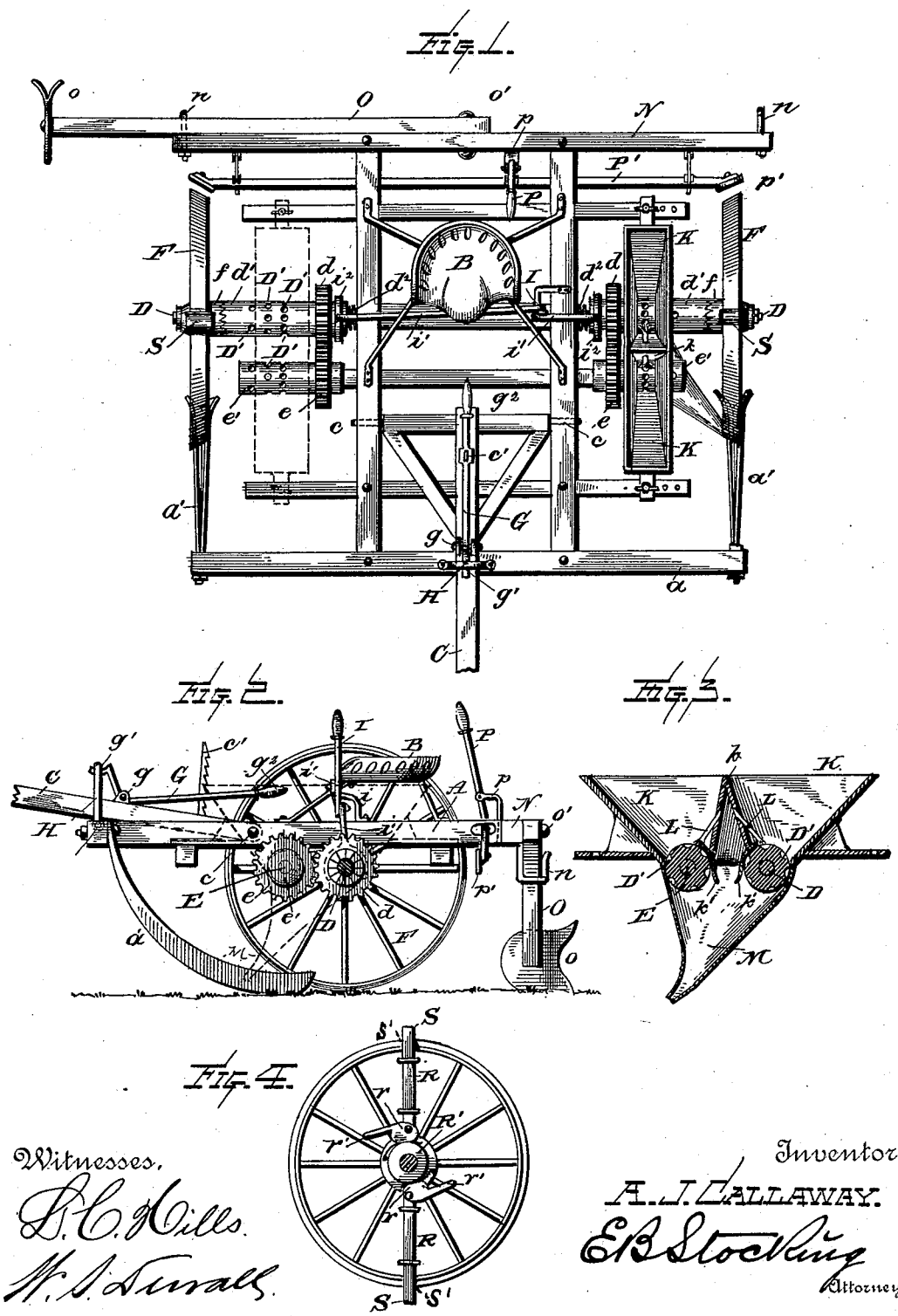
Witnesses.
Inventor
A. J. CALLAWAY.
E B Stocking
Attorney

UNITED STATES PATENT OFFICE.

ANDREW J. CALLAWAY, OF CHESTNUT HILL, INDIANA.

CORN-PLANTER AND DRILL COMBINED.

SPECIFICATION forming part of Letters Patent No. 400,897, dated April 9, 1889.

Application filed December 19, 1887. Serial No. 258,395. (No model.)

*To all whom it may concern:*

Be it known that I, ANDREW J. CALLAWAY, a citizen of the United States, residing at Chestnut Hill, county of Washington, and State of Indiana, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

My invention relates to that class of corn-planters in which the checking of the hills is effected by means of the wheels and whereby the rows may be closed by the action of said wheels in passing over them.

In the drawings, Figure 1 is a top plan view of my improved corn-planter, showing one of the grain-boxes in dotted lines and the other in detail. Fig. 2 is a side view of my improved corn-planter with one of the driving-wheels removed and both grain-boxes taken away. Fig. 3 is a vertical section of one of my improved grain-boxes, showing the details whereby the dropping of the corn is controlled. Fig. 4 is an inside view of one of the driving-wheels of my improved corn-planter, showing the arrangement of my hill-checking device.

Like letters of reference indicate like parts throughout the drawings.

I designate the frame of my planter by the letter A. Upon this frame is mounted the seat B, and to the front of said frame is attached the tongue C.

D represents the usual axle of the planter, which is mounted in the frame A, and E represents a transverse shaft. The wheels F are mounted upon the axle D and have inwardly-beveled tires, as plainly shown in the figures.

Attached to either end of the forward beam, $a$, of the frame are the runners $a'$, which extend backward to the ground just in front of the wheels, as shown. These runners serve to open up the ground for the reception of the seed, and, as will be further shown, the grain is fed directly into the groove of these runners. The tongue C is pivoted at the points $c$ in the frame and is maintained at a constant level by means of the attachment to the horses. A rack, $c'$, is attached to this tongue and passes through an aperture in the handle of a lever, G, which is pivoted at the bracket $g$, attached to the tongue. The smaller arm of this lever passes under a straddling bracket, H, which is fastened at each side of the tongue to the forward beam, $a$, of the frame. By depressing the handle $g^2$ of the lever G the whole frame A is tilted up at its forward end and the runners lifted from the ground. To facilitate this action, I proportion the parts of the planter to equalize the weight on either side of the axle D, about which it is pivoted. The axle D is provided with gear-wheels $d$ on either side of the seat, which mesh with similar gears, $e$, loosely mounted on the shaft E. The gears are all loosely mounted and with them rotate; also turn the attached cylinders $d'$ and $e'$, respectively. These cylinders are connected to the driving-wheels by means of toothed clutches at either end, as shown in Fig. 1, and by the intervention of these clutches the driving-wheels are enabled to turn the cylinders $d'$, and these in turn by the gears $d$ communicate their revolution to the cylinder $e'$ through the gears $e$.

Between the gears $d$ and the side beams of the frame A are inserted the spiral springs $d^2$, which tend to thrust the cylinders and gears $d'$ and $d$ outward and in position to gear with the clutches on the driving-wheels shown at $f$. A lever, I, pivoted to a bracket, $i$, on one of the side beams just at one side of the operator is employed to throw the cylinders in and out of connection with the clutches upon the driving-wheels. This is accomplished by means of a double pivotal connection with the rods $i'$, one below and the other above the point of pivoting of the lever I with the bracket $i$, as shown in Fig. 2. It is evident from this figure that if the lever is thrown to one side or the other the cylinders will move in opposite directions either away from or nearer to the seat, and thus engage or disengage with the clutches $f$.

In the periphery of the cylinders $d'$ are set several series of shallow hollows D'. These series have different numbers of hollows, and are designed to be used for cases of thinner or thicker sowing, as may be desired, that series having the greatest number of hollows sowing the thickest, and so on to the series with the fewest holes, in which the fewest seeds will be dropped in a given distance. I prefer to make my cylinders with three rows of slots or hollows, as shown in Fig. 1. Of course the series of hollows are so arranged that the series upon the cylinders $e$ will always lie opposite to those on the cylinder $d$, although it may not be necessary that the holes be of equal numbers on the two cylinders nor of the same size, as this matter will depend upon the judgment of the operator in choosing a machine as to the relative amounts of fertilizer to be used with different grains.

Over the two cylinders a hopper, K, is fitted so as to slide at will along the cylinders, and thus be capable of adjustment over the different series of holes in the said cylinders. This hopper is provided with a double partition, $k$, each division of which has a spring, $k'$, attached just at its junction with the cylinders, as shown in Fig. 3. These springs are for the purpose of retaining the grains in the hollows until they have passed the proper point to fall freely into the chute. This chute (designated by M in Fig. 3) extends downward and to one side, so as to end just above the runner $a'$ on each side of the planter, and by its means the seed and fertilizer are fed into said chute and thence into the furrow. Brushes L are provided for the purpose of cutting off too great a flow or preventing the passage of grain or fertilizer by any other means than the hollows. The bottom of each box is narrowed down so as to cover a space upon the cylinders corresponding to a single row of hollows. In the ordinary manipulation of the planter it will be best to use fertilizer in one of the boxes and over one of the axles and grain over the other. I prefer to place the fertilizer in the box over the shaft E, and the grain in that over the axle D. These grain and fertilizer boxes are fastened to two laterally-extending beams of the frame by means of pins passing through holes in said beams corresponding to the various series of hollows on the cylinders. This prevents the movement of the boxes when the cylinders are shifted by means of the lever I.

Extending from side to side of the planter and attached to its back is the marker-support N, bearing brackets $n$ at its two ends. The marker-beam O is pivoted at the point $o'$ to the marker-support N and bears at its outer end the marker $o$, as shown in Figs. 1 and 3. This marker $o$ is for the purpose of cutting the ground slightly at the proper distance from center of the planter, in order to mark the proper running of the machine in the next row to be sowed.

A lever, P, is bracketed at $p$ to the inside of the marker-support, and bears at its lower end a rod, P', which passes through a slot in the side beams of the frame, as shown in Fig. 2, and bearing the scraper-shoes at either end, as shown in Fig. 1. By the oscillation of this lever the scraper-shoes are thrown in or out of contact with the surfaces of the wheels and act to clean them.

In the ordinary sowing of seed in rows the action of the wheels is to crowd by their bevel, and to thus thrust the earth that has been parted by the runners over onto the grain, and compact it at the same time; but where it is desired to have the corn planted in hills I have provided an attachment (shown in Fig. 4) for the purpose of checking the hills at the proper intervals. This attachment consists of two arms slidingly attached to the inside of opposite spokes of the driving-wheel, as shown at R in Figs. 1 and 4. To the inner or hub ends of these arms are attached pivoted cam-levers $r$, provided with short arms $r'$. These cams bear and ride against the opposite sides of the hubs R' of the wheels, and are so arranged with regard to their pivotal point that when the arms are at one side of their pivot the arms R will be projected beyond the rim of the wheel, and when at the other side said arms will be withdrawn until their marking ends S are flush with the rim of the wheel, said ends taking into the depressions S' formed in the said rim. These arms are provided at their outer bent ends S with depressed faces, which press into the earth and make the hills, as desired. When not in action, these faces set into the depressions S' in the surfaces of the wheels, and are entirely out of the way.

I do not wish to be understood as limiting myself to the exact details of construction shown and described above, as it is evident that many minor details of this device might be varied by the exercise of mechanical skill without departing from the spirit of my invention.

Having thus described my invention and shown its various advantages, what I believe to be new, and what I therefore claim, is—

1. In a seed-planter, a frame having an axle provided with seed-delivering cylinders loosely mounted thereon, formed with a clutch and provided with wheels having toothed clutches to coact with those of the cylinders, and spiral springs between said cylinders and the frame of the planter, in combination with a lever, I, pivoted to said frame and connected by means of rods to said cylinders.

2. In a seed-planter, the axle D and shaft E, provided with cylinders connected by cogwheels and bearing hollows disposed in circumferential rows, the double box K, fitting over said cylinders and provided with a chute extending downward and to one side, in combination with the beveled wheels F, the tongue C, the lever G, and the grooved runners $a'$, extending in front of the wheels and under the chute on the box K, substantially as described.

3. The combination, with the rotatable cylinders $d$ $d'$, having the circumferential seed-hollows D', in combination with the hopper K, having the inclined dividing partition $k$, terminating in the joint seed-chute M, the guards $k'$, mounted over the cylinders, and the brushes L, projecting from the partition in contact with the cylinders, substantially as and for the purpose specified.

4. In a seed-planter, the driving-wheels provided with the sliding arms R, having curved faces S, and provided with cams $r$, having arms $r'$, substantially as described.

5. In a seed-planter, the driving-wheels provided with the sliding arms R, provided with curved faces S, projecting over the faces of said wheels, and recesses for the reception of said projecting faces, in combination with the cams $r$, as described.

ANDREW J. CALLAWAY.

Witnesses:
GEORGE R. GRAY,
DENNIS GRAY.